United States Patent Office 3,396,158
Patented Aug. 6, 1968

3,396,158
PREPARATION OF ALGINIC ACID BY
EXTRACTION OF ALGAE
Arne Haug, Trondheim, Norway, assignor to Norsk
Institutt for Tang-og Tareforskning, Trondheim,
Norway
No Drawing. Filed Nov. 2, 1964, Ser. No. 408,327
8 Claims. (Cl. 260—209.6)

Alginic acid is a polyuronic acid which is found in brown algae, and it is known that this polyuronic acid can be extracted as water-soluble sodium alginate by the addition of excess of alkali. The extraction process was first described by Stanford in 1881 (Brit. Pat. 142/1881), and a whole series of variations of Stanford's method have subsequently been described in the patent literature. The most familiar are:

(1) Green's process (U.S. Patent 2,036,934), in which the algae are pre-extracted with hydrochloric acid, the aliginic acid is extracted with excess of sodium carbonate at a pH of 10, the solution is filtered and precipitated with calcium chloride, whereby the calcium alginate is precipitated out, and (2) Le Gloachec-Herter's process (U.S. Patent 2,128,531), in which the algae are first extracted with calcium chloride, then extracted with excess of sodium carbonate, undissolved particles are removed by flotation, and the solution is precipitated with acid, whereby alginic acid is precipitated out. It is a characteristic feature that the variations of the process relate in the first degree to the pre-extraction and precipitation, whilst the alginate extraction is always effected with excess of alkali.

It is also known that the alkali extracts become more or less brownish and that this brown colour accompanies the alginates, which therefore for most purposes have to be bleached. The cause of this brown colour has not previously been elucidated, but we have found that it is principally due to phenolic compounds. Some of these phenolic compounds are capable of being extracted with acid, and are therefore removed by pre-extraction. The remainder is not extracted in acidic or neutral medium, but dissolve in alkaline medium, where they polymerize and form brownish compounds.

Thus, when alginate as in the previously known processes is extracted with excess of alkali, the extract, and thereby also the alginate, will be more or less brown in colour.

The present invention is based on this comprehension, and it is an important feature of the process of the invention that the alga material $a$ obtained after the pretreatment or pre-extraction, is subjected to a water exraction under such conditions that the pH does not exceed 7. The final extraction of the alginate is thus performed, as distinguished from previously employed processes, without the use of excess of alkali, thereby obtaining the substantial advantage that the formation of brownish polymerization products of the phenols is avoided. At the same time a considerable saving in subsequent precipitation process is also obtained by the fact that there is no consumption of acid for neutralization of excess alkali, if acid precipitation is used as the isolation method. If calcium chloride is used for the precipitation, we avoid the accompanying precipitation of calcium carbonate which occurs when excess soda is used in the extraction and which leads to increased consumption of acid in the subsequent conversion of calcium alginate to alginic acid.

In the following the problems in connection with the pre-extraction or the pre-treatment are discussed further.

More recent investigations have shown that alginic acid from various algae may have different chemical compositions. Alginic acid is composed of two uronic acids: mannuronic acid and guluronic acid. Alginic acid from Laminaria digitata and Ascophyllum nodosum is a type with more mannuronic acid than guluronic acid, whilst alginic acid from Laminaria hyperborea stipes contains substantially more guluronic acid than mannuronic acid. The properties of the alginic acid depend on the composition (Acta Chem. Scand., 13, 1250 [1959]), and it is a necessary postulate for successful execution of the process according to the invention to have acquaintance with these conditions.

The alginic acid is present as a mixed salt, in which the principal cation is calcium. This mixed salt is insoluble in water, and we can regard the extraction process as a process in two stages: first, conversion of the alginate into a form which is soluble in water, e.g. sodium alginate, and then a diffusion of the soluble alginate out into the solvent, e.g. water. The first step in the process—conversion of the alginate into extractable form—can in principle be effected in two ways: (1) By a direct ion exchange reaction, whereby the calcium ions which are bound to the alginic acid are exchanged with sodium ions. We thereby get the alginate in the alga converted into a watersoluble form, namely sodium alginate, which can then be dissolved out of the alga material with water. (2) A conversion of the calcium alginate in the algae into alginic acid, which in its turn is converted into sodium alginate by neutralization. The alginate in the algae is thereby converted into a water-soluble form and can be extracted from the alga material with water.

Method 1 can be effected by pre-extracting the algae with a NaCl solution. The concentrations of sodium chloride must be so high that the ion exchange reaction $CaAlg_2 + 2Na^+ \rightleftharpoons 2NaAlg + Ca^{2+}$ is forced so far over to the right that the alginate becomes water-soluble. The equilibrium of this ion exchange reaction depends on the composition of the alginic acid. Alginic acid with a high content of guluronic acid has a higher affinity to calcium than alginic acid with more mannuronic acid. For example, it may be mentioned that alginate from Laminaria digitata which is shaken with a large volume of water containing 0.01 N $CaCl_2$ and 0.8 N NaCl acquires a calcium content corresponding to 10% of the cations being calcium and 90% sodium, whilst in order to obtain a corresponding calcium content for alginate from Laminaria hyperborea stipes we must have a NaCl concentration of about 1.3 N under otherwise equal conditions. It is also possible to add a calcium binder in order to reduce the calcium concentration and thereby facilitate the ion exchange reaction. The sodium chloride concentration which is used in the pre-extraction is so high (more than 1 N) that the alginate does not dissolve in the pre-extract. The alginate is then extracted with water, if necessary with heating.

Method 2 is effected by extracting the algae with diluted acid, as earlier described, for example, in Green's process. Previously this step in the process has been regarded as a removal of acid-soluble components, such as laminarin, mannitol, fucoidin, etc. In our view the essential feature of the pre-extraction is that the insoluble alginate in the algae is converted into alginic acid. Previously it was the practice to add excess alkali. Thereby sodium alginate is neutralized, while at the same time the water-insoluble sodium alginate thereby formed is extracted. Owing to the excess alkali the extraction is performed by means of an alkaline extraction agent. In our process only sufficient alkali is added to neutralize the alginic acid. We thereby, as formely, get the alginic acid in the algae converted into water-soluble form, but owing to the fact that we do not use excess alkali, our extraction agent is not alkaline, but neutral, or slightly acid. It is of decisive importance for the process that the pre-extraction has removed a sufficiently large part of the calcium content. For example it may be mentioned that in the case of Laminaria digitata with an alginic acid content of 25% solids we get an extract yield of 12% by extraction in neutral medium when 14% of the cations were calcium, whilst the yield was 19 to 23% when 10 and 5%, respectively, of the cations were calcium.

It has been generally throught that the viscosity of alginic acid varies with the degree of acidity, so that the viscosity has a maximum in neutral medium. Experiments have shown, however (Acta Chem. Scand. 16, 1569 (1962)), that we get the same reduction of viscosity by the addition of a neutral salt, such as sodium chloride, to an aqueous, neutral sodium alginate solution, as by the addition of alkali. No particular difficulties are therefore encountered in the separation of particles on account of higher viscosity, when the extraction is performed in neutral medium.

Example 1

Alginate rich in mannuronic acid: One part dry Ascophyllum nodosum is pre-extracted for 4–5 hours with 50 parts of 2 N sodium chloride solution. The pre-extract is filtered off and thrown away. 50 parts of water of about 50° C. is added to the wet mass and the mixture is allowed to stand at 50° C. under agitation for 4 hours. The alga particles are separated off, for example by filtration, and the alginate is isolated from the clear, slightly coloured extract by precipitation with acid, calcium chloride or alcohol in a yield of 20–25%.

Example 2

Alginate rich in mannuronic acid: One kg. dry Laminaria digitata, containing 1.9 equivalents alginic acid per kg., is pre-extracted with 50 litres water containing 3.5 equivalents of sulphuric acid. After being allowed to stand for two hours the liquid is filtered off. After washing with water, 50 litres of water containing 2 equivalents of sodium carbonate are added. The mixture is allowed to stand for 3–4 hours under agitation and undissolved alga particles are removed, for example, by flotation after the liquid has been diluted until suitable viscosity has been attained. The extract is colourless and has pH of 6.0. The alginate is isolated by one of the methods previously mentioned in a yield of 25.30%.

Example 3

Alginate rich in guloronic acid: One kg. dry Laminaria hyperborea stipes, which contains 1.5 equivalents of alginic acid per kg., is pre-extracted with 50 litres of water containing 5 equivalents of hydrochloric acid. After standing for one hour under slow agitation the liquid is filtered off and thrown away. The wet mass is washed with water and to it is then added 50 litres of water containing 1.6 equivalents of sodium hydroxide. The mixture is allowed to stand under agitation for 4 hours and sodium chloride is added to a concentration of 0.1 N. Undissolved alga particles are filtered off. The extract is colourless and has a pH of 6.5. The alginate is isolated by one of the previously mentioned methods in a yield of 20–25%.

Example 4

Alginate rich in guluronic acid: One kg. dry Laminaria hyperborea stipes containing 1.5 equivalents of alginic acid per kg. is pre-extracted for 4 hours with 50 parts of 2 N sodium chloride solution. The extract is filtered off and thrown away. 50 parts of water of 50° C. containing 0.3 equivalents of sodium oxalate is added and the mixture stands at 50° C. under agitation for 4–5 hours. The alga particles are filtered off and the alginate is isolated from the colourless extract by one of the methods previously mentioned in a yield of 20–25%.

I claim:

1. In the method for the preparation of alginic acid by the extraction of algae and the subsequent precipitation of alginic acid from the extract, the improvement according to which the alga material is pre-extracted with an aqueous solution of a neutral alkali metal salt to convert the calcium alginate material to sodium alginate and subsequently extracting the sodium alginate-containing material with water, the pH during the process being maintained below 7.

2. A method as in claim 1 wherein the pre-extraction step is carried out utilizing an aqueous solution of sodium chloride.

3. A method as in claim 2 wherein a 0.8 to 2.5 N aqueous sodium chloride solution is employed.

4. A method as in claim 1 wherein the water extraction of the sodium alginate-containing material is carried out with heating.

5. A method as in claim 4 wherein a temperature of about 50° C. is utilized.

6. In the method for the preparation of alginic acid by extraction of algae and subsequently precipitating alginic acid from the extract, the improvement according to which the alga material is subjected to a pre-extraction with a dilute mineral acid to convert calcium alginate to alginic acid and subsequently extracting the alginic acid containing material with water containing sodium hydroxide in an amount not above that necessary to convert the alginic acid to sodium alginate so that the pH during the process does not rise above 7.

7. A method as in claim 6 wherein the pre-extraction step is carried out utilizing dilute sulfuric acid.

8. A method as in claim 6 wherein the pre-extraction step is carried out with dilute hydrochloric acid.

References Cited

UNITED STATES PATENTS

| 1,814,981 | 7/1931 | Thornley et al. | 260—209.6 |
| 1,778,688 | 10/1930 | Reynard | 260—209.6 |
| 1,516,917 | 11/1924 | Freundler | 260—209.6 |

OTHER REFERENCES

Bashford et al.: "Manufacture of Algal Chemicals," Journal of the Society of Chemical Industry, vol. 69, November 1950, pp. 337–342.

Alexander: Colloid Chemistry, vol. 6, Rheinhold Publishing, N.Y. (1946), pp. 674–677.

DONALD E. CZAJA, *Primary Examiner.*

R. W. MULCAHY, *Assistant Examiner.*